US007683247B2

(12) United States Patent
Nishida

(10) Patent No.: US 7,683,247 B2

(45) Date of Patent: Mar. 23, 2010

(54) KEYBOARD APPARATUS

(75) Inventor: Kenichi Nishida, Hamamatsu (JP)

(73) Assignee: Yamaha Corporation, Hamamatsu-shi (JP)

(*) Notice: Subject to any disclaimer, the term of this patent is extended or adjusted under 35 U.S.C. 154(b) by 707 days.

(21) Appl. No.: 11/488,974

(22) Filed: Jul. 18, 2006

(65) Prior Publication Data

US 2007/0017338 A1 Jan. 25, 2007

(30) Foreign Application Priority Data

Jul. 21, 2005 (JP) ............................. 2005-211508
Jun. 5, 2006 (JP) ............................. 2006-156173

(51) Int. Cl.
*G01D 13/02* (2006.01)

(52) U.S. Cl. .................................................. 84/423 R

(58) Field of Classification Search ............... 84/423 R, 84/430-433

See application file for complete search history.

(56) References Cited

U.S. PATENT DOCUMENTS 4,205,583 A 6/1980 Absmann
4,308,783 A 1/1982 Absmann
4,914,999 A 4/1990 Masubuchi et al.
6,051,767 A * 4/2000 Masubuchi ............... 84/423 R
6,156,963 A 12/2000 Masubuchi et al.
2008/0066608 A1 * 3/2008 Osuga ...................... 84/423 R

FOREIGN PATENT DOCUMENTS

JP 60-052439 3/1985
JP 64-091186 A 4/1989
JP 10-240228 9/1998
JP 3060938 4/2000

* cited by examiner

*Primary Examiner*—Kimberly R Lockett
(74) *Attorney, Agent, or Firm*—Morrison & Foerster LLP

(57) ABSTRACT

A keyboard apparatus in which the radius of turning motion of a mainly operated portion of each black key in a key depressing/releasing direction is maximized so as to enhance the operability of the black key for performance. The keyboard apparatus has a key frame formed with fixing parts. In the key frame, there are arranged a plurality of key units each having a plurality of white keys and a plurality of black keys integrally connected to a common base end part held by the fixing parts of the key frame. Each of the white keys and the black keys comprises a base end part, a key main body, and a hinge part connecting the key main body to the base end part such that the key main body is swingable about the base end part in the key depressing/releasing direction, and the hinge part of each of the black keys is located rearward of the hinge part of each of the white keys.

15 Claims, 4 Drawing Sheets

KEYBOARD APPARATUS

BACKGROUND OF THE INVENTION

1. Field of the Invention

The present invention relates to a keyboard apparatus having a plurality of white keys and black keys, each of which has a key main body connected to a base end part via a hinge part such that the key main body is swingable in a key depressing/releasing direction.

2. Description of the Related Art

Conventionally, there are known keyboard apparatuses having a plurality of white keys and black keys each comprised of a base end part, a key main body, and a hinge part connecting the key main body to the base end part such that the key main body is swingable in a key depressing/releasing direction. For example, in a keyboard apparatus proposed in Japanese Laid-Open Patent Publication (Kokai) No. H10-240228, a key unit formed by integrally connecting a plurality of white keys and black keys to a common base end part is rigidly secured to a key frame at the common base end part of the white and black keys. More specifically, the key unit is comprised of two white key units and a single black key unit, and the base end part of the black key unit is laid on the base end parts of the two white key units.

In the keyboard apparatus proposed in Japanese Laid-Open Patent Publication (Kokai) No. H10-240228, however, the hinge part of each white key and that of each black key are arranged at the same longitudinal (front-rear) direction, whereas the distance between a "mainly operated portion" of a key main body, which is very frequently subjected to key depressing operation, and a base end part of the key is different between the white key and the black key. More specifically, since the free end of the black key is farther from a player than that of the white key (in other words, the free end of the black key is located rearward of that of the white key), the distance between the "mainly operated portion" of the key main body and the base end part (i.e. the radius of turning motion in the key depressing/releasing direction) is shorter in the black key than in the white key. Therefore, it is difficult to obtain a sufficient key depression stroke of the black key, which increases the key touch weight of the black key. For this reason, the black key is inferior to the white key in operability for performance.

SUMMARY OF THE INVENTION

It is an object of the present invention to provide a keyboard apparatus in which the radius of turning motion of a mainly operated portion of each black key in a key depressing/releasing direction is maximized so as to enhance the operability of the black key for performance.

To attain the above object, in a first aspect of the present invention, there is provided a keyboard apparatus comprising a support member having a key base end support part, and a key unit having a plurality of white keys and a plurality of black keys, the white keys and the black keys being integrally connected to a common base end part, and the common base end part being held by the key base end support part of the support member, wherein each of the white keys and the black keys comprises a base end part, a key main body, and a hinge part connecting the key main body to the base end part such that the key main body is swingable about the base end part in a key depressing/releasing direction, and the hinge part of each of the black keys is located rearward of the hinge part of each of the white keys.

With the arrangement of the first aspect of the present invention, it is possible to maximize the radius of turning motion of the mainly operated portion of each black key in the key depressing/releasing direction, thereby enhancing the operability of the black key for performance.

Preferably, each of the white keys has another hinge part provided between the hinge part and the base end part so as to enable the key main body to swing about the base end part in a key arrangement direction, and the hinge part of each of the black keys and the another hinge part of each of the white keys are arranged at approximately the same longitudinal location.

With the arrangement of this preferred embodiment, it is possible to make effective use of a space between the hinge enabling swinging motion of the white key in the key depressing/releasing direction and the base end part of the white key in providing the hinge part enabling swinging motion of the white key in the key arrangement direction, so as to accommodate deviation of the key main body of the white key in the key arrangement direction.

More preferably, the another hinge part has an upper end face formed as a sloping surface sloping down and forward.

With the arrangement of this more preferred embodiment, it is possible to avoid interference between the hinge part of the black key and the other hinge part of the white key during downward pivotal motion of the black key.

Preferably, each of the white keys has another hinge part provided between the hinge part and the base end part so as to enable the key main body to swing with respect to the base end part in a key arrangement direction, and the another hinge part of each of the white keys is provided within a range in a longitudinal direction between a front end and a rear end of the hinge part of each of the black keys.

With the arrangement of this preferred embodiment, it is possible to make effective use of a space between the hinge enabling swinging motion of the white key in the key depressing/releasing direction and the base end part of the white key in providing the hinge part enabling swinging motion of the white key in the key arrangement direction, so as to accommodate deviation of the key main body of the white key in the key arrangement direction.

Preferably, the hinge part of each of the black keys has a laterally forked structure having a laterally inner portion thereof blanked, and a width of an entirety of the hinge part in a key arrangement direction is configured to be larger than a width of an associated key body of the black keys.

To attain the above object, in a second aspect of the present invention, there is provided a keyboard apparatus comprising a support member having a key base end support part, and a plurality of keys including a plurality of white keys and a plurality of black keys, each of the keys comprising a base end part, a key main body, and a hinge part connecting the key main body to the base end part such that the key main body is swingable about the base end part in a key depressing/releasing direction, wherein the base end parts of the respective white keys and the base end parts of the respective black keys are held by the key base end support part of the support member, in a state aligned at a longitudinal location, and the hinge part of each of the black keys is located rearward of the hinge part of each of the white keys.

With the arrangement of the second aspect of the present invention, it is possible to provide the same advantageous effect as provided by the keyboard apparatus of the first aspect of the present invention.

Preferably, each of the white keys has another hinge part provided between the hinge part and the base end part so as to enable the key main body to swing about the base end part in a key arrangement direction, and the hinge part of each of the black keys and the another hinge part of each of the white keys are arranged at approximately the same longitudinal location.

With the arrangement of this preferred embodiment, it is possible to provide the same advantageous effect as provided by the preferred embodiment of the first aspect of the present invention.

More preferably, the another hinge part has an upper end face formed as a sloping surface sloping down and forward.

With the arrangement of this preferred embodiment, it is possible to provide the same advantageous effect as provided by the more preferred embodiment of the first aspect of the present invention.

Preferably, each of the white keys has another hinge part provided between the hinge part and the base end part so as to enable the key main body to swing with respect to the base end part in a key arrangement direction, and the another hinge part of each of the white keys is provided within a range in a longitudinal direction between a front end and a rear end of the hinge part of each of the black keys.

With the arrangement of this preferred embodiment, it is possible to provide the same advantageous effect as provided by the preferred embodiment of the first aspect of the present invention.

Preferably, the hinge part of each of the black keys has a laterally forked structure having a laterally inner portion thereof blanked, and a width of an entirety of the hinge part in a key arrangement direction is configured to be larger than a width of an associated key body of the black keys.

To attain the above object, in a third aspect of the present invention, there is provided a keyboard apparatus comprising a support member having a key base end support part, and a key unit having a plurality of white keys and a plurality of black keys, the white keys and the black keys being integrally connected to a common base end part, and the common base end part being held by the key base end support part of the support member, wherein each of the white keys and the black keys comprises a base end part, a key main body, and a hinge part connecting the key main body to the base end part such that the key main body is swingable about the base end part in a key depressing/releasing direction, wherein each of the black keys of the key unit comprises a base end part, a key body, and a connecting part connecting the key body to the base end part, wherein the connecting part of each of the black keys comprises a thick part extending from a rear end of the key body of the black key, and a thin hinge part connecting between the thick part and the base end part of the black key, the key body being made pivotable with respect to the base end part in a key depressing/releasing direction by the thin hinge part, and wherein the thin hinge part of each of the black keys is located rearward of the hinge part of the each of the white keys.

With the arrangement of this preferred embodiment, it is possible to provide the same advantageous effect as provided by the preferred embodiment of the first aspect of the present invention.

Preferably, each of the white keys has another hinge part provided between the hinge part and the base end part so as to enable the key main body to swing about the base end part in a key arrangement direction, and the thin hinge part of each of the black keys and the another hinge part of each of the white keys are arranged at approximately the same longitudinal location.

With the arrangement of this preferred embodiment, it is possible to provide the same advantageous effect as provided by the preferred embodiment of the first aspect of the present invention.

More preferably, the another hinge part has an upper end face formed as a sloping surface sloping down and forward.

With the arrangement of this preferred embodiment, it is possible to provide the same advantageous effect as provided by the more preferred embodiment of the first aspect of the present invention.

Preferably, each of the white keys has another hinge part provided between the hinge part and the base end part so as to enable the key main body to swing with respect to the base end part in a key arrangement direction, and the another hinge part of each of the white keys is provided within a range in a longitudinal direction between a front end and a rear end of the thin hinge part of each of the black keys.

With the arrangement of this preferred embodiment, it is possible to provide the same advantageous effect as provided by the preferred embodiment of the first aspect of the present invention.

Preferably, the connecting part of each of the black keys has a laterally forked structure having a laterally inner portion thereof blanked, and a width of an entirety of the connecting part in a key arrangement direction is configured to be larger than a width of an associated key body of the black keys.

With the arrangement of this preferred embodiment, it is possible to provide the same advantageous effect as provided by the preferred embodiment of the first aspect of the present invention.

The above and other objects, features, and advantages of the present invention will become more apparent from the following detailed description taken in conjunction with the accompanying drawings.

DETAILED DESCRIPTION OF THE PREFERRED EMBODIMENTS

The present invention will now be described in detail with reference to the drawings showing a preferred embodiment thereof.

Figure 1:
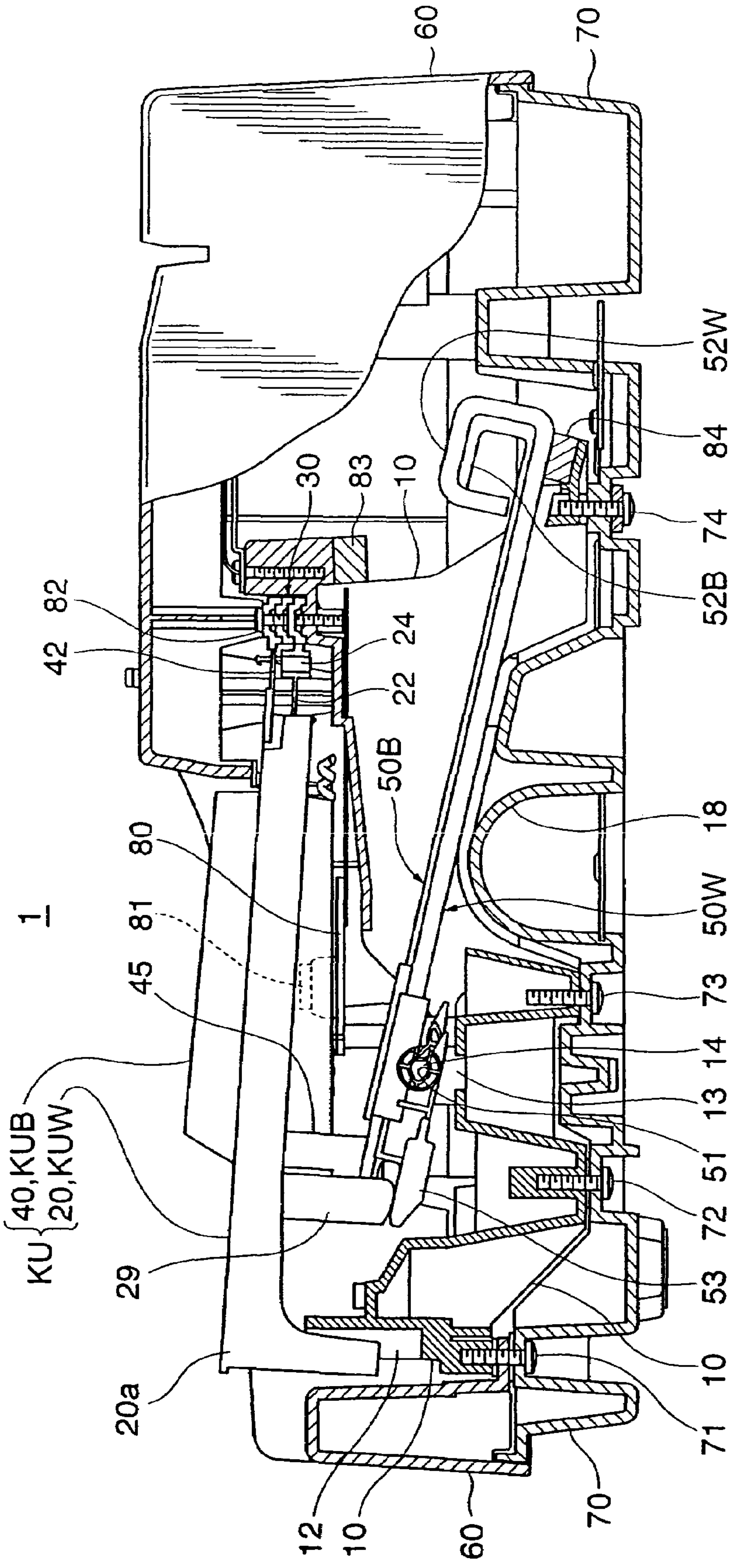
FIG. 1 is a longitudinal cross-sectional view of a keyboard apparatus according to an embodiment of the present invention.

FIG. 1 is a longitudinal cross-sectional view of a keyboard apparatus according to an embodiment of the present invention. This keyboard apparatus 1 is configured as an electronic keyboard instrument. In the following, a player's side (left side, as viewed in FIG. 1) of the keyboard apparatus 1 will be referred to as the "front" side.

As shown in FIG. 1, the keyboard apparatus 1 has a key frame 10 disposed in a casing formed by an upper case 60 and a lower case 70. In the key frame 10, there are arranged a plurality of key units KU each comprised of a plurality of white keys 20 and a plurality of black keys 40. Each of the key units KU has a common base end part 30 rigidly secured to the key frame 10, and the keys 20 and the black keys 40 are each arranged such that a free end part thereof is vertically pivotable (or swingable). The arrangement of the key unit KU will be described in detail hereinafter.

The key frame 10 is fastened to the lower case 70 by a plurality of screws 72, 73, and 74. Further, the lower case 70, the upper case 60, and the key frame 10 have respective front parts thereof fastened together by a plurality of bolts 71. The lower case 70 and the upper case 60 have respective rear parts thereof fastened to each other by screwing a plurality of screws, not shown, into respective suitable points of the lower case 70 and the upper case 60. The lower case 70 has a lower part thereof formed with a recess 18 e.g. for accommodating batteries.

Hereafter, component elements of the keyboard apparatus 1 which are of the same kind and provided in association with the white keys 20 and the black keys 40 are each designated by the same reference numeral, but when it is required to distinguish between the association with a white key 20 and that with a black key 40, the associated component elements of the same kind are distinguished from each other by adding "W" and "B" to the respective reference numerals.

Mass bodies 50 (50W and 50B) are arranged in the frame 10 in association with the white keys 20 and the black keys 40, respectively. Each of the mass bodies 50W and 50B is supported by an associated bearing 51 such that it is vertically pivotable about a pivot 14 disposed on mass body-supporting ribs 13 integrally formed with the key frame 10. Almost all mass of each mass body 50 (50W or 50B) is concentrated on a rear end part 52 (52W or 52B) of the mass body 50 (50W or 50B).

A hanging driving piece 29 is formed integrally with the bottom of the front part of the white key 20 such that the hanging driving piece 29 extends downward therefrom. A hanging driving piece 45 is formed integrally with the bottom of the front part of the black key 40 such that the hanging driving piece 45 extends downward therefrom. The hanging driving pieces 29 and 45 have a resilient member, made of rubber or the like, secured to a lower end thereof, and the lower end of each of the hanging driving pieces 29 and 45 serve as a driving part for directly driving the associated mass bodies 50W and 50B. When the lower engaging part 53 is driven, the mass body 50 is pivotally moved along with the associated key, whereby an appropriate inertial force is applied to the key to realize touch feeling similar to that obtained from an acoustic piano.

An upper limit stopper 83 projects from an upper rear part of the key frame 10, and a lower limit stopper 84 projects from a lower rear part of the same. The upper limit stopper 83 and the lower limit stopper 84 may be provided in association with each key, but in the present embodiment, they are commonly provided for a plurality of keys (all the keys in the apparatus or all the keys in one key unit KU, for example). The rear end part 52 of the mass body 50 comes into abutment with the lower limit stopper 84, which defines a non-depressed position (initial position) of the mass body 50 and the associated key. On the other hand, the rear end part 52 of the mass body 50 comes into abutment with the upper limit stopper 83, which defines a depression end position (pivotal motion end position) of the mass body 50 and the associated key.

Further, key-on switches 81 are arranged on a substrate 80 disposed on the key frame 10, in association with the respective white and black keys 20 and 40. Each of these key-on switches 81 detects depression of an associated one of the keys. A tone generator, not shown, generates musical tones based on results of detection by the key-on switches 81.

Further, a front part of the key frame 10 is formed with key guide parts 12 each for guiding the associated key being operated for depression. The key guide parts 12 are formed in association with the respective white keys 20. Each of the white keys 20 has a front end part 20*a* formed with a guided part, not shown, for engagement with an associated one of the key guide parts 12, such that the engagement between the guided part and the key guide part 12 restricts transverse movement of the front end part 20*a* of the white key 20 and properly guides the same for a proper vertical motion.

Figure 2:
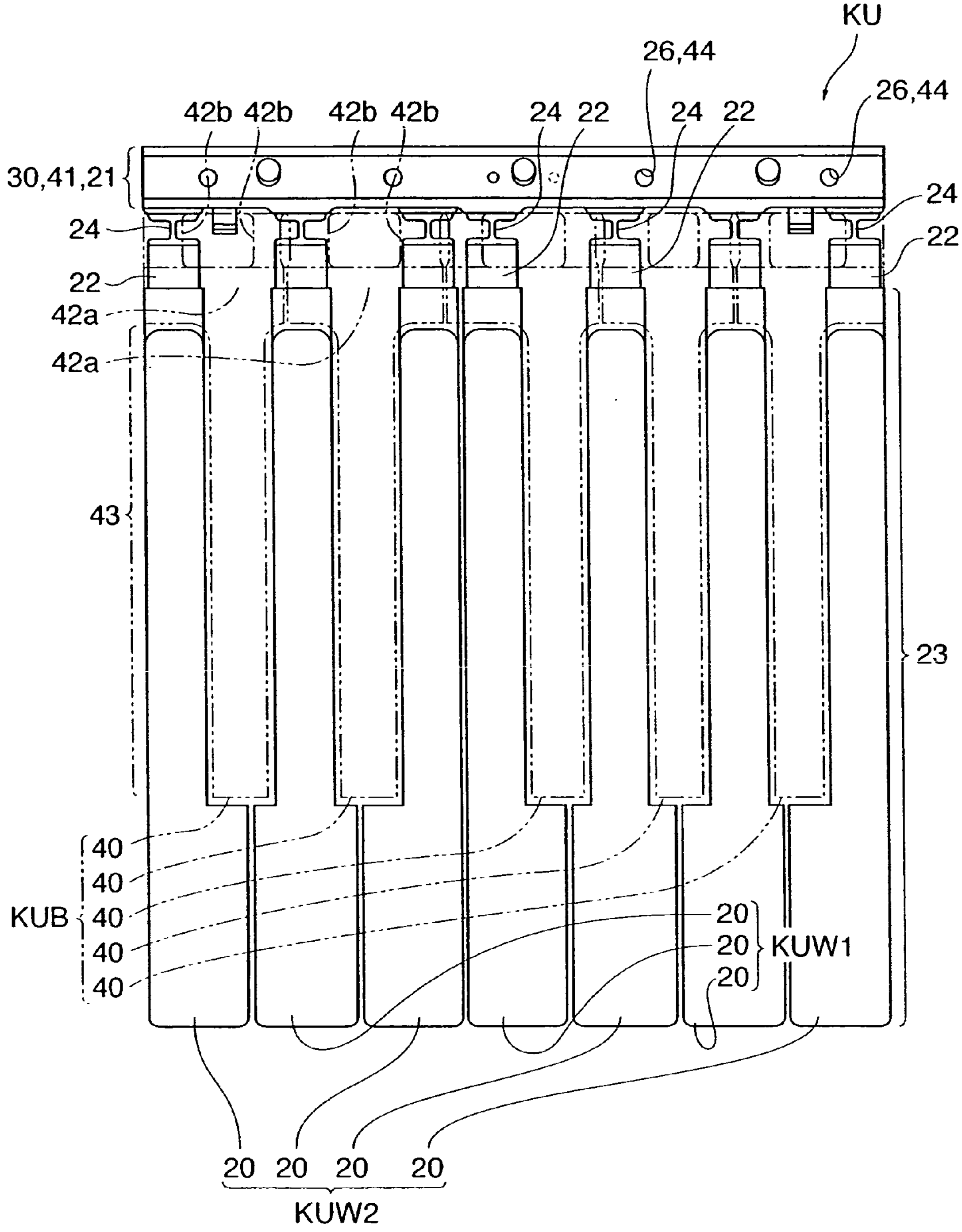
FIG. 2 is a plan view of a key unit.
Figure 3:
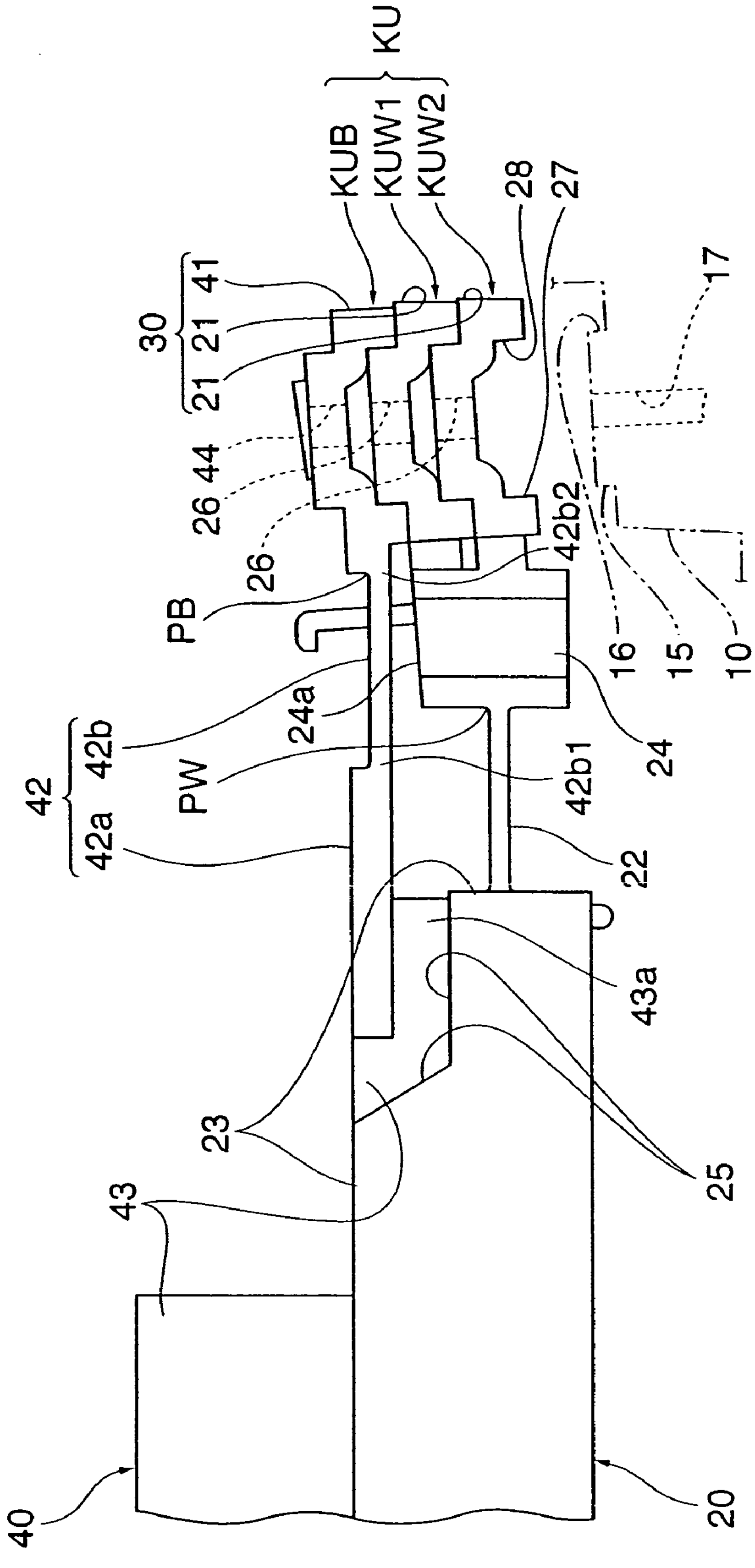
FIG. 3 is a side view of a rear half of the key unit.

FIG. 2 is a plan view of the key unit KU. The key unit KU is comprised of two white key units KUW (KUW1 and KUW2) and one black key unit KUB. In FIG. 2, the key unit KUB is shown by phantom lines. FIG. 3 is a side view of a rear half of the key unit KU.

Although in the present embodiment, one key unit KU is formed as a one-octave unit as shown in FIG. 2, this is not limitative, but insofar as a plurality of keys are included, the key unit KU may be otherwise configured. For example, keys of more than two octaves may be integrally formed into a key unit KU. As shown in FIGS. 2 and 3, the white key unit KUW is comprised of a first white key unit KUW1 in which white keys 20 assigned respective pitch names "D, F, and A" are integrally connected to a base end part 21 and a second white key unit KUW2 in which white keys 20 assigned respective pitch names "C, E, G, and B" are integrally connected to a base end part 21 thereof. The black key unit KUB is formed by integrally connecting black keys 40 assigned respective pitch names "C#, D#, F#, G#, and A#" to a base end part 41 thereof.

Each of the first white key unit KUW1 and the second white key unit KUW2 is formed by connecting white key bodies 23 to the associated base end part 21 via respective vertical hinge parts 24 and respective horizontal hinges 22, each in the form of a thin plate. The vertical hinge part 24 connected to the base end part 21 is easy to bend in the transverse direction, so that when in a free state, the vertical hinge part 24 permits a free end of the associated white key body 23 to swing in the key arrangement direction (transverse direction). This vertical hinge part 24, the key guide part 12 (see FIG. 1), and the guided part, not shown, of the front end part 20*a* of the associated white key 20 cooperate to properly correct positional deviation of the white key body 23 in the key arrangement direction due to manufacturing errors or mounting errors.

The horizontal hinge 22 connected to the front side of the vertical hinge part 24 is easy to bend in the vertical direction, so that when in a free state, the horizontal hinge 22 permits the free end of the white key body 23 to pivot in the key depressing/releasing direction (vertical direction) about the base end part 21 and the vertical hinge part 24. Further, the white key body 23 has an upper rear part thereof formed with a relief part 25 for avoiding interference with the associated black key 40 performing pivotal motion.

Figure 4:
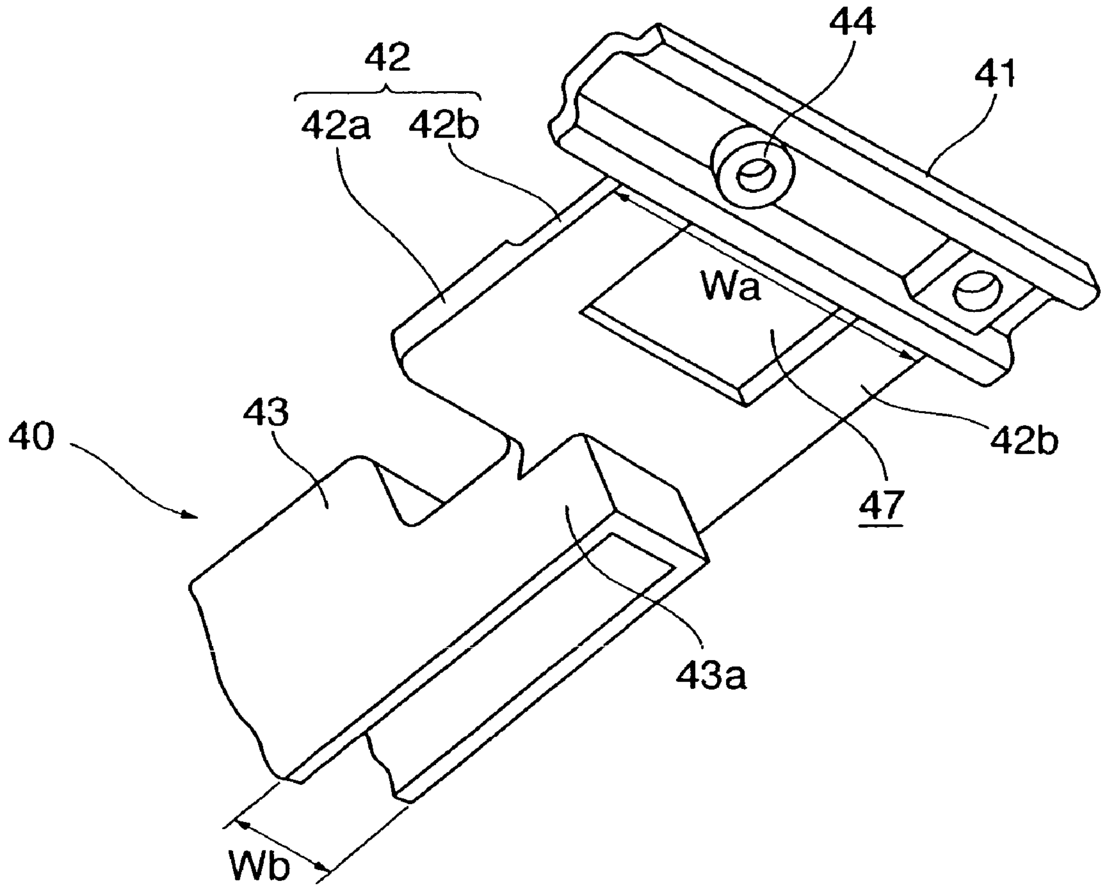
FIG. 4 is a perspective view of a rear half of a black key as viewed obliquely from below.

FIG. 4 is a perspective view of a rear half of a black key as viewed obliquely from below. As shown in FIGS. 3 and 4, the black key unit KUB is formed by connecting a plurality of black key bodies 43 to the based end part 41 via a connecting part 42. The connecting part 42 is comprised of a thick part 42*a* and thin horizontal hinge parts 42*b*. More specifically, the thick part 42*a* extends from a rear end 43*a* of each black key body 43 in the key arrangement direction and in the rearward direction, and the thick part 42*a* and the base end part 41 are connected by the horizontal hinge parts 42*b*.

As shown in FIG. 2 (phantom lines) and FIG. 4, the horizontal hinge parts 42*b* are provided for the black key bodies 43, respectively, and are formed at locations laterally spaced from each other. More specifically, a portion of the connecting part 42 rearward of the thick part 42*a* has a laterally inner portion thereof blanked, whereby the horizontal hinge parts 42*a* have a laterally forked structure. Further, a width Wa of the entirety of the horizontal hinge parts 42*b* in the key arrangement direction is configured to be larger than a width Wb of the associated black key body 43.

The thick part 42*a* is sufficiently thicker than the horizontal hinge parts 42*b*, and hence are hardly bent by only such a force as given by a key depressing operation. Similarly to the horizontal hinge 22, the horizontal hinge parts 42*b* substantially allow the free end of the associated black key body 43 to pivotally move about the base end part 41 in the key depressing/releasing direction. Strictly, a pivot about which the white key body 23 pivotally moves is located at a connecting point PW between the vertical hinge part 24 and the horizontal hinge 22, and a pivot about which each black key body 43 pivotally moves is located at a connecting point PB between the base end part 41 and the horizontal hinge parts 42*b* (see FIG. 3). Further, the longitudinal center of each of the horizontal hinge 22 and the horizontal hinge parts 42*b* corresponds to a substantial center of pivotal motion of each of the white key bodies 23 and the black key bodies 43.

Here, since the horizontal hinge parts 42*b* are wide hinges, the swing of the free end (front end) of the black key body 43 in the key arrangement direction during key depression is restricted even without provision of a key operation guide. Further since the horizontal hinge parts 42*b* have a forked structure having a laterally inner portion thereof blanked, it is possible to prevent them from being too high in rigidity even with a wide hinge structure thereof, and provide an excellent hinge function of making the black key body 43 pivotable in the key depressing direction. Therefore, the dispensing with the key operation guide and the securing of the hinge function are compatibly attained.

As shown in FIG. 3, the base end part 21 of the second white key unit KUW2, the base end part 21 of the first white key unit KUW1, and the base end part 41 of the black key unit KUB are stacked and fitted one upon another in the mentioned order from below to form the common base end part 30. The base end parts 21, 21, and 41 are each formed therethrough with a plurality of screw fastening holes 26, 26, and 44, respectively. The base end part 21 of the second white key unit KUW2 has a lower part thereof, which is also a lower part of the common base end part 30, formed with contact surfaces 27 and 28 in facing relation, with reference to which the contact surfaces 27 and 28 are positioned in the front-rear direction.

On the other hand, as shown in FIG. 3, fixing parts 15 and 16 for having the common base end part 30 secured thereto are formed on an upper part of the key frame 10 at respective locations slightly rearward of the center of the key frame 10 in the longitudinal direction in a manner associated with the contact surfaces 27 and 28, respectively. The fixing parts 15 and 16 are formed by respective front and rear end faces of a portion projecting upward from the key frame 10. In an intermediate portion of the key frame 10 between the fixing parts 15 and 16 in the longitudinal direction, there are formed a plurality of screw holes 17 corresponding to the respective screw fastening holes 26 and 44.

The common base end part 30 is rigidly fastened to the key frame 10 by bringing the contact surfaces 27 and 28 of the common base end part 30 into contact with the fixing parts 15 and 16, respectively, in opposed relation to each other, and screwing screws 82 (see FIG. 1) into the respective screw holes 17 via the respective associated screw fastening holes 26 and 44 of the common base end part 30. This places the white keys 20 and the black keys 40 in a state pivotable by operation for performance. It should be noted that the manner of fixing the common base end part 30 is not limited to this.

In the key unit KU formed in one piece, the horizontal hinge part 42*b* of each black key 40 is located rearward of the horizontal hinge 22 of the associated white key 20. Therefore, the connecting point PB is also located rearward of the connecting point PW. This maximizes the distance between the base end part 41 (more accurately, the connecting point PB) as a pivot of the black key 40 and the free end of the same to thereby enhance operability of the black key 40 for performance.

Further, the vertical hinge part 24 of each white key 20 and the horizontal hinge part 42*b* of the associated black key 40 are arranged at approximately the some longitudinal location, in other words, the vertical hinge part 24 is located approximately just below the horizontal hinge part 42*b*. Strictly, the vertical hinge part 24 is located within a range in the longitudinal direction between a front end 42*b*1 and a rear end 42*b*2 of the horizontal hinge part 42. In short, the vertical hinge part 24 is disposed by making effective use of a space below the horizontal hinge part 42*b*.

Further, the vertical hinge part 24 has an upper end face thereof formed as a sloping surface 24*a* slightly sloping down and forward (see FIG. 3), so as to avoid interference between the horizontal hinge part 42*b* of the black key 40 and the vertical hinge part 24 of the white key 20 during downward pivotal motion of the black key 40.

According to the present embodiment, since the horizontal hinge part 42*b* of the black key 40 is located rearward of the horizontal hinge 22 of the associated white key 20, an increased radius of turning motion of the mainly operated portion of the black key 40 can easily be secured. This makes it easier to obtain a sufficient key depression stroke of the black key 40 and make touch feeling lighter than in the prior art. This can improve the operability of the black key 40 for performance. Further, since the vertical hinge part 24 of the white key 20 and the horizontal hinge part 42*b* of the black key 40 are arranged at approximately the same longitudinal location, and the vertical hinge part 24 is located within a range in the longitudinal direction between the front end 42*b*1 and the rear end 42*b*2 of the horizontal hinge part 42, it is possible to make effective use of the space below the horizontal hinge part 42*b* between the horizontal hinge 22 and the base end part 21 in providing the vertical hinge part 24 so as to accommodate deviation of the white key body 23 of the white key 20 in the key arrangement direction.

Although in the present embodiment, the key unit KU which integrally includes a plurality of keys is shown, by way of example, this is not limitative, but a structure may be employed in which the base end parts of respective independent keys are aligned at the same longitudinal location and held by the key frame 10.

What is claimed is:

1. A keyboard apparatus comprising:

a support member having a key base end support part; and a key unit having a plurality of white keys and a plurality of black keys, said white keys and said black keys being integrally connected to a common base end part, and said common base end part being held by said key base end support part of said support member, wherein each of said white keys and said black keys comprises a base end part, a key main body, and a hinge part connecting said key main body to said base end part such that said key main body is swingable about said base end part in a key depressing/releasing direction, and said hinge part of each of said black keys is located rearward of said hinge part of each of said white keys.

2. A keyboard apparatus as claimed in claim 1, wherein each of said white keys has another hinge part provided between said hinge part and said base end part so as to enable said key main body to swing about said base end part in a key arrangement direction, and said hinge part of each of said black keys and said another hinge part of each of said white keys are arranged at approximately the same longitudinal location.

3. A keyboard apparatus as claimed in claim 2, wherein said another hinge part has an upper end face formed as a sloping surface sloping down and forward.

4. A keyboard apparatus as claimed in claim 1, wherein each of said white keys has another hinge part provided between said hinge part and said base end part so as to enable said key main body to swing with respect to said base end part in a key arrangement direction, and said another hinge part of each of said white keys is provided within a range in a longitudinal direction between a front end and a rear end of said hinge part of each of said black keys.

5. A keyboard apparatus as claimed in claim 1, wherein said hinge part of each of said black keys has a laterally forked structure having a laterally inner portion thereof blanked, and a width of an entirety of said hinge part in a key arrangement direction is configured to be larger than a width of an associated key body of said black keys.

6. A keyboard apparatus comprising:

a support member having a key base end support part; and a plurality of keys including a plurality of white keys and a plurality of black keys, each of said keys comprising a base end part, a key main body, and a hinge part connecting said key main body to said base end part such that said key main body is swingable about said base end part in a key depressing/releasing direction, wherein said base end parts of said respective white keys and said base end parts of said respective black keys are held by said key base end support part of said support member, in a state aligned at a longitudinal location, and said hinge part of each of said black keys is located rearward of said hinge part of each of said white keys.

7. A keyboard apparatus as claimed in claim 6, wherein each of said white keys has another hinge part provided between said hinge part and said base end part so as to enable said key main body to swing about said base end part in a key arrangement direction, and said hinge part of each of said black keys and said another hinge part of each of said white keys are arranged at approximately the same longitudinal location.

8. A keyboard apparatus as claimed in claim 7, wherein said another hinge part has an upper end face formed as a sloping surface sloping down and forward.

9. A keyboard apparatus as claimed in claim 6, wherein each of said white keys has another hinge part provided between said hinge part and said base end part so as to enable said key main body to swing with respect to said base end part in a key arrangement direction, and said another hinge part of each of said white keys is provided within a range in a longitudinal direction between a front end and a rear end of said hinge part of each of said black keys.

10. A keyboard apparatus as claimed in claim 6, wherein said hinge part of each of said black keys has a laterally forked structure having a laterally inner portion thereof blanked, and a width of an entirety of said hinge part in a key arrangement direction is configured to be larger than a width of an associated key body of said black keys.

11. A keyboard apparatus comprising:

a support member having a key base end support part; and a key unit having a plurality of white keys and a plurality of black keys, said white keys and said black keys being integrally connected to a common base end part, and said common base end part being held by said key base end support part of said support member, wherein each of said white keys and said black keys comprises a base end part, a key main body, and a hinge part connecting said key main body to said base end part such that said key main body is swingable about said base end part in a key depressing/releasing direction, wherein each of said black keys of said key unit comprises a base end part, a key body, and a connecting part connecting said key body to said base end part, wherein said connecting part of each of said black keys comprises a thick part extending from a rear end of said key body of said black key, and a thin hinge part connecting between said thick part and said base end part of said black key, said key body being made pivotable with respect to said base end part in a key depressing/releasing direction by said thin hinge part, and wherein said thin hinge part of each of said black keys is located rearward of said hinge part of said each of said white keys.

12. A keyboard apparatus as claimed in claim 11, wherein each of said white keys has another hinge part provided between said hinge part and said base end part so as to enable said key main body to swing about said base end part in a key arrangement direction, and said thin hinge part of each of said black keys and said another hinge part of each of said white keys are arranged at approximately the same longitudinal location.

13. A keyboard apparatus as claimed in claim 12, wherein said another hinge part has an upper end face formed as a sloping surface sloping down and forward.

14. A keyboard apparatus as claimed in claim 11, wherein each of said white keys has another hinge part provided between said hinge part and said base end part so as to enable said key main body to swing with respect to said base end part in a key arrangement direction, and said another hinge part of each of said white keys is provided within a range in a longitudinal direction between a front end and a rear end of said thin hinge part of each of said black keys.

15. A keyboard apparatus as claimed in claim 11, said connecting part of each of said black keys has a laterally forked structure having a laterally inner portion thereof blanked, and a width of an entirety of said connecting part in a key arrangement direction is configured to be larger than a width of an associated key body of said black keys.

* * * * *